Patented Oct. 23, 1951

2,572,572

UNITED STATES PATENT OFFICE 2,572,572

Ar-CYCLOHEXYLSTYRENE AND POLYMER THEREOF

David T. Mowry and Raymond B. Seymour, Dayton, Ohio, assignors to Monsanto Chemical Company, St. Louis, Mo., a corporation of Delaware No Drawing. Application February 5, 1945, Serial No. 576,362

10 Claims. (Cl. 260—88.1)

The present invention relates to styrene derivatives, more particularly to certain nuclear cyclohexyl derivatives of styrene, and to resinous and rubbery materials derived therefrom.

An object of the present invention is the provision of new polymerizable and copolymerizable monomeric materials. Another object of the invention is the provision of a new styrene derivative which, when polymerized either alone or in the presence of other compounds possessing ethylenic unsaturation, yields new and highly useful products for the synthetic resin and the synthetic rubber industries.

These and other objects which will be hereinafter disclosed are provided by the following invention whereby there are provided the hitherto unknown, nuclearly substituted cyclohexyl styrenes, the polymers and copolymers thereof. Ortho-, meta- and para-cyclohexylstyrenes in the monomeric form are colorless, somewhat high-boiling liquids which polymerize readily at ordinary or elevated temperatures to yield clear, colorless, solid resinous materials of good thermal and mechanical properties.

Copolymers of cyclohexylstyrene may be obtained by copolymerizing any one of the isomeric cyclohexylstyrenes, or mixtures thereof with at least one other polymerizable organic material having ethylenic unsaturation. Particularly valuable synthetic rubbery materials having age-resisting properties may be made by copolymerization of the present cyclohexylstyrenes with conjugated dienes such as butadiene or substituted butadiene compounds.

Polymerization is preferably carried out by treating mixtures of the monomeric cyclohexylstyrenes and polymerizable materials possessing ethylenic unsaturation in the monomeric state under polymerizing conditions, such as by the application of heat either with or without the aid of polymerization assisting catalysts. However, instead of employing the monomeric cyclohexylstyrene and another material having ethylenic unsaturation which is likewise in the monomeric form, it is also possible to carry out the copolymerization by employing partially polymerized materials (but still possessing some ability to further polymerize) in the mixture which is treated under polymerizing conditions.

Our new styrene derivatives are readily obtainable from the isomeric cyclohexylacetophenones, for example, according to the following series of reactions for para-cyclohexylstyrene:

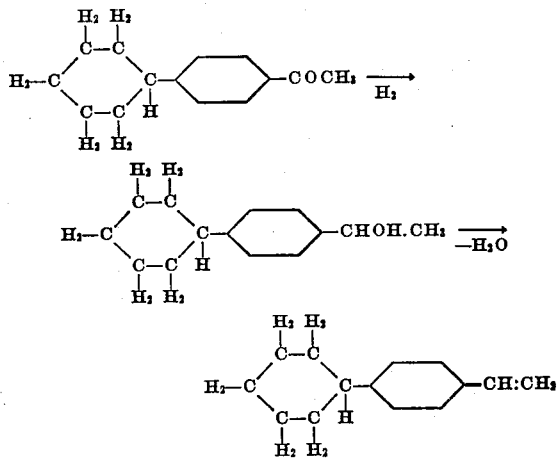

Para-cyclohexylacetophenone, prepared by the Friedel-Crafts reaction from phenylcyclohexane (see Mayes and Turner. J. Chem. Soc. 1929, 500–508) is reacted with hydrogen in the presence of a hydrogenating catalyst such as copper chromite to yield the hitherto unknown carbinol, alpha - methyl - para - cyclohexylbenzyl alcohol. The new carbinol is readily dehydrated, for example, by passage in the vapor phase over a dehydrating catalyst or by treatment in the liquid phase with a dehydrating agent to yield the likewise hitherto unknown para-cyclohexylstyrene.

The cyclohexylstyrenes are also obtainable by reaction of nuclear aromatic iodo or bromo derivatives of cyclohexylbenzene with magnesium to yield a Grignard reagent, condensation of the Grignard reagent with acetaldehyde to yield one of the isomeric carbinols (alpha-methyl-para-cyclohexylbenzyl alcohol, alpha-methyl-ortho-cyclohexylbenzyl alcohol or alpha-methyl-meta-cyclohexylbenzyl alcohol) and dehydration of the resulting carbinol to yield the cyclohexylstyrene.

The invention is further illustrated, but not limited, by the following examples:

Example 1

Preparation of alpha-methyl-para-cyclohexylbenzyl alcohol: Employing 19 g. of copper chromite catalyst, 378 g. (1.87 moles) of recrystallized para-cyclohexylacetophenone was treated with hydrogen at an initial pressure of 1,575 lbs. and a temperature of 26° C. Within one-half hour, the pressure in the hydrogenation vessel had risen to 2,000 lbs. and the temperature to 112° C. After a total time of 3 hours and 20 minutes, at which time the temperature of the reaction mass was 137° C. and the pressure was 1,550 lbs., the hydrogen flow was discontinued and the reaction mixture allowed to cool. After the product had cooled to room temperature, it was dissolved in absolute alcohol, the catalyst was filtered off, and the filtrate was distilled through an 8" Vigreux column. There was thus obtained 333.5 g. (87.3% theoretical yield) of a fraction, B. P. 122–129° C./1 mm. which was converted upon cooling to a white solid, M. P. 78° C.–81.5° C. Recrystallization from dilute ethanol gave a pure product, M. P. 81° C.–82.5° C., which analyzed as follows:

|  | Per Cent C | Per Cent H |
| --- | --- | --- |
| Calcd. for $C_{14}H_{19}O$ | 82.30 | 9.87 |
| Found | 82.55 | 9.84 |

Accordingly, the product is alpha-methyl-para-cyclohexylbenzyl alcohol. Alpha-methyl-ortho-cyclohexylbenzyl alcohol or alpha-methyl-meta-cyclohexylbenzyl alcohol are prepared in the same manner from ortho- or meta-cyclohexylacetophenone, respectively.

Preparation of para-cyclohexylstyrene: 265 g. (1.3 moles) of alpha-methyl-para-cyclohexylbenzyl alcohol dissolved in 450 ml. of xylene was passed through a 2 ft. vertical silica tube having an internal diameter of 1 inch, which was packed with 4–8 mesh activated alumina. The tube was heated to a temperature of from 305° C. to 320° C. and addition of the solution was made at the rate of 100 ml. per hour. The vapors passed through a water-cooled condenser and into a 2-liter suction flask which was cooled by a Dry-Ice bath to a temperature of −60° C. After addition of the solution was completed, the column was washed with benzene and the washings were added to the condensate. Distillation of the combined washings and condensate separated off 23 ml. (1.3 moles) of water, and the solvent was subsequently removed by distillation in vacuo. Distillation of the residue was carried out in a 1 ft. Vigreux column under reduced pressure employing powdered sulfur as a polymerization inhibitor. There was obtained 211 g. (87.2% yield) of a fraction, B. P. 104.5–106.5° C./2 mm., which was a colorless liquid, $n_D^{25}$ 1.5518. Redistillation of this fraction gave 195 g. (80.6% yield) of a purer product, B. P. 98–104° C./1.5–2 mm., $n_D^{25}$ 1.5515, and analyzing as follows:

|  | Per Cent C | Per Cent H |
| --- | --- | --- |
| Calcd. for $C_{14}H_{17}$ | 90.25 | 9.72 |
| Found | 90.16 | 9.97 |

The product is substantially pure para-cyclohexylstyrene. Ortho and meta - cyclohexylstyrene are obtainable in the same manner by dehydration of alpha-methyl-ortho-cyclohexylbenzyl alcohol or alpha-methyl-meta-cyclohexylbenzyl alcohol, respectively.

Although in this example, preparation of the carbinol is effected by hydrogenation in the presence of copper chromite, other known hydrogenation catalysts may also be used. If, however, catalysts such as Raney nickel or platinum or palladium be employed, care should be exercised that the conditions used are not so severe that hydrogenation takes place in the aromatic nucleus or that the ketone be reduced to the hydrocarbon. Using the copper chromite catalyst, little danger of such excessive hydrogenation will be encountered, at least at temperatures below 135° C.–145° C.

Dehydration of the carbinol to the para-cyclohexylstyrene may likewise be carried out upon other types of catalysts than the activated alumina used above. Generally, inert masses of large surface are preferred and particularly silica, silica gel, minerals or glass fragments may be employed. Metals should be avoided. Temperatures should be above 250° C. and below temperatures at which thermal cracking takes place. Temperatures ranging from 275° C.–320° C. are preferred and have been found to give good yields of the para-cyclohexylstyrene. However, the temperature may range upwardly to 600° C. or 625° C. Also, the dehydration reaction may be carried out in the presence of a diluent such as water vapor, nitrogen or carbon dioxide.

While dehydration may be effected in the liquid phase, best results are obtained when it is carried out in the vapor phase. If, as shown above, a solution of the carbinol is employed, the solvent should be one which does not undergo decomposition at the reaction temperature. However, a solvent need not be employed. For example, the carbinol may be vaporized in a preheater, and the vapors passed therefrom over and through the dehydrating catalyst. Good results are also obtained by flashing the carbinol into vapor by dropping upon a heated surface, in such manner that flash evaporation thereof takes place at pressures below atmospheric. In either the presence or absence of a solvent, optimum conditions for the vapor phase dehydration comprise pressures of below atmospheric and preferably pressures of from 50 mm. to 375 mm. pressure absolute, i. e., from $\frac{1}{15}$ to about $\frac{1}{2}$ of an atmosphere.

*Example 2*

This example shows the polymerization of para-cyclohexylstyrene. 100 parts of para-cyclohexylstyrene was mass polymerized by submitting it to a temperature of 70° C. for 6 days, then to a temperature of 100° C. for 7 days and finally at a temperature of 125° C. for 2 days. The product was a clear, colorless solid having a melting point of >300° C. and a softening point of 132° C., which was soluble in hexane, gasoline, and lubricating oil. On the other hand, a similarly prepared polystyrene had a lower softening point and was insoluble in these solvents.

Upon grinding and molding under heat and pressure the polymeric para-cyclohexylstyrene of this example yielded transparent, molded products of good mechanical strength and thermal stability.

Ortho- and meta-cyclohexylstyrene are similarly polymerizable to yield products which are readily molded to form hard, transparent objects.

Polymerization of the cyclohexylstyrenes may also be effected in the presence of catalysts of polymerization, for example, oxygen-yielding organic or inorganic compounds such as benzoyl peroxide, hydrogen peroxide or potassium persulfate. In the presence of such catalysts, polymerization is advantageously conducted at lower temperatures than those used in the present example.

Example 3

This example shows the interpolymerization of para-cyclohexylstyrene with styrene. A mixture consisting of 60 per cent by weight of styrene and 40 per cent by weight of para-cyclohexylstyrene was polymerized for 6 days at a temperature of 70° C., for 7 days at a temperature of 100° C. and then finally for 2 days at a temperature of 125° C. The product was a clear, colorless solid, which was soluble in hexane and gasoline and had a heat-distortion point of 96° C. On the other hand, a similarly prepared polystyrene was found to be insoluble in these solvents and to possess a heat-distortion point of only 74° C. The heat-distortion points of both the copolymer and the polystyrene were determined according to the procedure given in the American Society for Testing Materials, Specification D648-41T, found in the American Society for Testing Material Book of Standards for 1942 on page 1060.

The high heat-distortion point of the present copolymer recommends it for use in many applications in which polystyrene, due to its propensity to become deformed at the lower temperatures, cannot be employed. The styrene-para-cyclohexylstyrene copolymer is thus advantageously employed in applications requiring high stability to heat, for example, as solid dielectric in transformers or capacitors, or in radio coil forms and supports. Solutions of the interpolymer may be employed for coating electrical conductors, or the copolymer may be extruded as a coating upon wires or cables. The copolymer may also be employed in the preparation of laminated or impregnated electrical insulating agents, and the partially copolymerized material may be used as a bonding for dielectric particles such as mica, the copolymerization being completed in situ.

Interpolymers of styrene and para-cyclohexylstyrene in a wide range of proportions may be prepared, since monomeric mixtures containing any ratio of styrene to para-cyclohexylstyrene are copolymerizable. The copolymerization may be effected in the presence or absence of catalysts of polymerization, and instead of para-cyclohexylstyrene the other isomers, ortho-cyclohexylstyrene or meta-cyclohexylstyrene may be used.

Example 4

A mixture consisting of 50 parts by weight of styrene, 30 parts by weight of para-cyclohexylstyrene and 20 parts by weight of acrylonitrile was polymerized by submitting it to a temperature of 70° C. for 6 days, a temperature of 100° C. for 7 days and a temperature of 125° C. for 2 days. The product was a clear, colorless solid of good thermal stability. Meta- and ortho-cyclohexylstyrene may be similarly interpolymerized with acrylonitrile.

Example 5

This example shows the copolymerization of para-cyclohexylstyrene with butadiene. 200 grams of a mixture consisting of 75% by weight of butadiene and 25% by weight of para-cyclohexylstyrene was emulsified in 500 g. of water containing 10 g. of soap, 1 g. of potassium persulfate and 1.4 g. of dodecyl mercaptan. The emulsion was polymerized by heating to 50° C. for 16 hours. At the end of this time, 2 g. of an antioxidant, a reaction product of para-aminobiphenyl and acetone was added to the product and the latex was coagulated with an aqueous solution containing acetic acid, aluminum sulfate and sodium chloride. There was thus obtained a 90% yield of a soft, rubbery material, which was then prepared for processing by washing free of emulsifier and drying under reduced pressure for 16 hours at a temperature of 45° C.

100 parts of the purified copolymer thus obtained was milled with 40 parts of carbon black, 3 parts of zinc oxide, 1 part of stearic acid, 1.75 parts of sulfur and 2 parts of a rubber vulcanization accelerator, a condensation product of mercaptobenzothiazole with cyclohexylamine and the compounded material was cured by heating it for 60 minutes at a temperature of 142° C. The following evaluation data were obtained for the cured product, before and after aging for 24 hours in circulating air at 100° C.

|  | Before Aging | After Aging |
| --- | --- | --- |
| Shore Hardness | 48 | 67 |
| Tensile Strength, p. s. i. | 1500 | 2,200 |
| Elongation, per cent | 830 | 620 |

The above values for tensile strength were determined on the Scott tester, according to the procedure described in the January 25, 1930, issue of Rubber Age. The Firestone plasticity measurement was made in a Firestone Plastometer, using 10 lbs. of air pressure at a temperature of 82° C.

For purposes of comparison a butadiene-styrene copolymer (75:25 weight ratio) was prepared by the emulsifying procedure herein showed, purified, and then compounded and cured as shown above for the present butadiene-para-cyclohexylstyrene copolymer. The Firestone plasticity before aging, was 12 seconds and the Mooney viscosity was 35 seconds. Evaluation of the resulting compounded and cured butadiene-styrene copolymer by the testing procedures employed above gave the flowing values:

|  | Before Aging | After Aging |
| --- | --- | --- |
| Shore Harness | 56 | 63 |
| Tensile Strength, p. s. i. | 1,835 | 1,850 |
| Elongation, per cent | 570 | 420 |

With respect to tensile strength and elongation, the present para-cyclohexylstyrene-butadiene rubber is better after aging than the butadiene-styrene copolymer is before or after aging.

Instead of using para-cyclohexylstyrene with butadiene for the production of improved rubbery products, there may be employed ortho-cyclohexylstyrene or meta-cyclohexylstyrene or isomeric mixtures of any two or three of the cyclohexylstyrenes. Also, instead of using butadiene, other butadiene compounds, for example, chloroprene, 2,3-dimethylbutadiene, isoprene, 2,3-dichlorobutadiene or 2-chloro-3-methylbutadiene may be similarly copolymerized with the cyclohexylstyrenes to give rubbery products. The ratio of butadiene to cyclohexylstyrene may be widely varied, though for the production of rubbery products at least 50% of the monomeric mixture should comprise a butadiene compound.

Instead of employing the emulsifying media shown above, there may be employed other expedients of emulsification. For example, instead of using dodecyl mercaptan as the modifier, there may be used the reaction product of hydrogen sulfide and triisobutylene or trichloropropionitrile. Soap may be replaced by other emulsifying agents, e. g., lauryl sulfate, or an alkylbenzene sulfonate, etc.

Other oxygen-liberating polymerization catalysts such as sodium perborate, ammonium persulfate, hydrogen peroxide or benzoyl peroxide may be employed instead of the potassium persulfate. Temperatures within the range of from 30° C. to 75° C. may be employed.

Non-rubbery materials may also be obtained by polymerization in mass, of a mixture of cyclohexylstyrene and a butadiene compound in any ratio, either in the presence or absence of a catalyst of polymerization. These products are cross-linked, hence insoluble in solvents generally; however, they may be produced by polymerizing the monomeric materials in a mold, or preferably by pouring a partially polymerized and hence flowable material in a mold and then heating to complete the polymerization.

In producing either polymeric cyclohexylstyrenes or interpolymers of cyclohexylstyrenes and other polymerizable compounds containing ethylenic unsaturation, considerable latitude may be employed in the polymerizing procedures shown. Polymeric cyclohexylstyrenes or interpolymers of cyclohexylstyrene and such polymerizable compounds as those containing a vinyl or vinylidene group, e. g., styrene or nuclear or chain-substituted derivatives, thereof, acrylic or methacrylic acid and its derivatives, vinyl esters, vinyl ketones, vinyl ethers, etc. may be obtained by polymerization of the monomer or mixture of monomers either in mass, in emulsion, in aqueous dispersion or in solution. Valuable products are obtained by conducting the polymerization in a material which is a solvent for the monomer or mixture of monomers and a non-solvent for the polymeric product.

Various details of the steps of the above-described process and products thereby obtained may be varied through a wide range without departing from the principles of this invention, which is limited only by the following claims:

What we claim is:
1. Ar-cyclohexylstyrene.
2. Para-cyclohexylstyrene.
3. Meta-cyclohexylstyrene.
4. Ortho-cyclohexylstyrene.
5. Polymeric ar-cyclohexylstyrene.
6. Polymeric para-cyclohexylstyrene.
7. A copolymer obtained by polymerizing ar-cyclohexylstyrene and styrene.
8. A copolymer obtained by polymerizing para-cyclohexylstyrene and styrene.
9. A copolymer obtained by polymerizing a mixture containing 60 per cent by weight of styrene and 40 per cent by weight of ar-cyclohexylstyrene.
10. The process for preparing a copolymer which comprises heating a mixture of ar-cyclohexylstyrene and styrene under polymerizing conditions.

DAVID T. MOWRY.
RAYMOND B. SEYMOUR.

REFERENCES CITED

The following references are of record in the file of this patent:

UNITED STATES PATENTS

| Number | Name | Date |
|---|---|---|
| 2,383,922 | Soday | Aug. 28, 1945 |
| 2,389,251 | Franz | Nov. 20, 1945 |

OTHER REFERENCES

Beilstein, Handbuch der organische Chemie, vol. V, page 525, in the 1922 edition, and vol. V, page 422, in the 1943 edition.

Chemical Abstracts, vol. 15, page 4,000. (1921)